US008843744B2

(12) United States Patent
Sentinelli et al.

(10) Patent No.: US 8,843,744 B2
(45) Date of Patent: Sep. 23, 2014

(54) METHOD AND DEVICES FOR DISTRIBUTING MEDIA CONTENTS AND RELATED COMPUTER PROGRAM PRODUCT

(75) Inventors: Alexandro Sentinelli, Milan (IT); Nicola Capovilla, Merate (IT); Luca Celetto, Udine (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 315 days.

(21) Appl. No.: 12/981,236

(22) Filed: Dec. 29, 2010

(65) Prior Publication Data

US 2011/0161668 A1      Jun. 30, 2011

(30) Foreign Application Priority Data

Dec. 30, 2009   (IT) .............................. TO2009A1055

(51) Int. Cl.
*H04L 9/32* (2006.01)
*H04L 29/06* (2006.01)
*H04L 29/08* (2006.01)

(52) U.S. Cl.
CPC ............. *H04L 67/104* (2013.01); *H04L 63/12* (2013.01)
USPC ............. 713/168; 713/176; 713/170; 726/23; 726/22; 707/625

(58) Field of Classification Search
CPC ......................... H04L 63/0428; H04L 63/0245
USPC .................. 713/170, 165–168; 726/25–27, 1; 707/217, 785, 827; 709/242
See application file for complete search history.

(56) References Cited

U.S. PATENT DOCUMENTS

| 5,646,997 | A |  | 7/1997 | Barton .......................... 713/176 |
|---|---|---|---|---|
| 6,028,605 | A | * | 2/2000 | Conrad et al. ................ 715/840 |
| 7,535,905 | B2 | * | 5/2009 | Narayanan et al. ........... 370/392 |
| 7,694,340 | B2 | * | 4/2010 | Raman et al. .................. 726/24 |
| 7,730,094 | B2 | * | 6/2010 | Kaler et al. .................... 707/785 |
| 8,205,242 | B2 | * | 6/2012 | Liu .................. 726/1 |
| 8,301,884 | B2 | * | 10/2012 | Choi ............................ 713/168 |
| 8,347,088 | B2 | * | 1/2013 | Moore et al. .................. 713/166 |
| 2003/0120928 | A1 |  | 6/2003 | Cato et al. ..................... 713/176 |
| 2003/0154468 | A1 | * | 8/2003 | Gordon et al. ................ 717/143 |
| 2005/0177602 | A1 | * | 8/2005 | Kaler et al. ................ 707/104.1 |
| 2005/0278390 | A1 | * | 12/2005 | Kaler et al. .................... 707/200 |
| 2007/0022469 | A1 | * | 1/2007 | Cooper et al. .................... 726/3 |
| 2007/0033170 | A1 |  | 2/2007 | Sull et al. .......................... 707/3 |

(Continued)

OTHER PUBLICATIONS

Giovanni Giufrida, Knowledge based metadata extraction from Postscript files, May 2000, vol. 5, pp. 77-84.*

*Primary Examiner* — Dede Zecher
*Assistant Examiner* — Viral Lakhia
(74) *Attorney, Agent, or Firm* — Allen, Dyer, Doppelt, Milbrath & Gilchrist, P.A.

(57) ABSTRACT

A method of distributing media content over networks where content is shared includes coupling downloading metadata, which is accessed to start downloading media contents from the network, with semantic metadata representative of the semantic information associated with at least one of the content, and with source metadata indicative of the source of the media content. At least one of the semantic and the source metadata may be made accessible without downloading, even partially, the media content. A digital signature may also be applied to the metadata to enable the verification that, at reception, the metadata is intact and has not been subjected to malicious tampering.

16 Claims, 7 Drawing Sheets

(56) References Cited

U.S. PATENT DOCUMENTS

| | | | |
|---|---|---|---|
| 2007/0038612 A1 | 2/2007 | Sull et al. | 707/3 |
| 2007/0226802 A1* | 9/2007 | Gopalan et al. | 726/24 |
| 2007/0239892 A1* | 10/2007 | Ott et al. | 709/242 |
| 2007/0289022 A1* | 12/2007 | Wittkotter | 726/27 |
| 2009/0192972 A1* | 7/2009 | Spivack et al. | 706/50 |
| 2011/0161668 A1* | 6/2011 | Sentinelli et al. | 713/168 |

* cited by examiner

METHOD AND DEVICES FOR DISTRIBUTING MEDIA CONTENTS AND RELATED COMPUTER PROGRAM PRODUCT

FIELD OF THE INVENTION

This disclosure relates to techniques for distributing media contents. More particularly, this disclosure relates to techniques for distributing media contents with respect to the field of Peer-to-Peer networks (P2P networks).

BACKGROUND OF THE INVENTION

Peer-to-Peer (P2P) networks are a particular kind of environment created at the application layer by a local software application, which is adapted to communicate to other users in the network that run the same software. This creates an overlay network at the application layer wherein every end user shares his/her own contents and resources with the peers of the whole overlay.

The "cooperation" aspect represents the main virtue of P2P systems because it allows the community to download/upload contents in a mutual cooperation mode and to grow indefinitely without the decreased need of any relatively powerful/dedicated servers. This feature is currently named network scalability.

There has long existed an interest for the ability to make and use the functions of P2P networks in a media context, and more particularly, with respect to audio and video signal streaming for web TV applications, which are encouraged by the growing spreading of wide band distribution networks. This is true both for the ability to deliver professional content and for the possible distribution of User Generated Content, where each user can be at a same time, a producer and a consumer of content, becoming in this way a "prosumer" (producer/consumer).

FIG. 1 shows, in the form of a functional block diagram, the main components of a P2P system. Specifically, in the diagram of FIG. 1, the references P0 and P1 schematically show the (fixed/mobile) terminals of two end users who cooperate in a P2P system by making use of a tracker T of a terminal operating as a client C0 and of a web server WS.

The file sharing in P2P systems is based upon the running of programs, which are used to create and maintain a network enabling the transmission of files among users. Users can therefore both download files from other users of the P2P network and specify file sets in the file system of their own terminal, which are adapted to be shared with others, i.e. to be made available to other users of the P2P network.

A file sharing protocol in a currently used Peer-to-Peer network adapted to distribute large amounts of data is known as BitTorrent. Beside the original client version, this protocol is available in several implementations, which are substantially analogous to, for example, aria2, ABC, BitComet, BitTornado, Deluge, Shareaza, Transmission, µTorrent, and Vuze (former Azureus). At present, several clients are available for a variety of computing platforms, which are capable of preparing, requesting, and transmitting any type of file over a network by making use of a protocol of this kind.

Substantially, the system schematically shown in FIG. 1 is based on the use of .torrent files that include metadata information about the original file to be shared by the P2P network users and by the tracker T which keeps track of the peers sharing the content. The tracker T plays the role of a central entity with which peers, such as P0 and P1, communicate periodically (substantially through a mechanism of periodical registration), so as to be aware of one another. The tracker T sends out and receives peer information and also maintains peer statistics.

It will, however, be appreciated that while the diagram of FIG. 1 refers to a tracker T of a centralized kind, it may also possible to resort to distributed approaches (such as, the Distributed Hash Table (DHT), for example) to keep track of the peers who are sharing a certain content at a certain point of time. It will be appreciated that what will be described in the following part of the present disclosure is irrespective of whether a centralized approach versus a distributed approach are resorted to. As for the BitTorrent clients sharing and downloading the content, at least one (i.e. the client denoted by C0 in FIG. 1) accesses the whole file made available by the web server WS for downloading. According to the current approach, the server WS is what the end user sees first at the moment of choosing the .torrent file. The web server WS is therefore one of the complementary actors to be taken into consideration while implementing a P2P network. To be more precise, the server WS is one of the possible entities that distribute the metadata, i.e. the .torrent file. Every peer in the network retrieves such a file to be able to access the media content itself. The way in which the metadata is retrieved may not be previously defined. The typical case is when the peers download it from the WS (or from another equivalent web server) through a normal client/server protocol. It is, however, possible to retrieve the metadata in other ways (via chat, Facebook, email, USB key, etc.).

In any case, the metadata may be distributed outside the P2P network. The overall structure of a torrent file (e.g. MyFile.torrent) includes the URL of the tracker T, and a dictionary or look-up (info) including the keys. One key is name, which is a name which is suggested to save the informing entity. If the entity is a single file, this key may represent a file name. If the entity comprises several files, this key may map to a directory name. Another key is piece length, which is the size of each piece of the entity, and a string (named "Pieces(*)"), which may include the concatenation of SHA1 hashes of each piece of the entity.

A length key includes the length of the file in bytes. If this key is present, it means that the entity is a single file; otherwise, the "files" key will be present, with the related list of the files set. If the entity to be downloaded is a directory of multiple files, instead of a length the "files" key will be present, with the related metadata information.

The files key includes a list of files and directories with the following keys: length: the length of the file in bytes; and path: a list of strings containing sub-directory names, the last string being the file name. In the case of a set of files, the directory name will be present. The .torrent files with this structure are metadata files that are created before the file or the files (i.e. the "entity") are shared.

Although they may not constitute the entity itself, .torrent files include the metadata to allow a BitTorrent client to download an entity (e.g., as already mentioned, the tracker URL, the filename, the number of pieces, etc. of the content). An advantage relating to the use of .torrent files is that they have far smaller sizes than the size of the original entity, which in the case, e.g. of media content with high resolution, may reach a size in the order of Gigabytes. The peers wishing to download an entity file must therefore first obtain a corresponding .torrent file and connect to the specified tracker. The latter tells them which of the other peers they can download the file pieces from. The users browse the web to find a torrent of interest, to download it, and to open it with a BitTorrent client. The client connects to the tracker or trackers specified in the .torrent file, wherefrom he receives a list of peers currently transferring pieces of the file(s) specified in the torrent. The proper downloading process can now start, with each peer sharing his upload resources and his contents in the overlay network, by exchanging blocks or "chunks" of the file.

The peer distributing a file (be it data or representing a multimedia content) treats the file as a series of identically-sized pieces. The peer creates a checksum for each piece, by using any suitable checksum algorithm, as, for example, the SHA1 hashing algorithm, and records it in the metadata .torrent file. The size of the piece is the same for each piece, and may be configurable by the user when he decides to create the metadata file. In the case of a relatively large payload, it may be possible to reduce the size of a metadata file by resorting to large sized pieces, for example, larger than 512 Kbytes, but this may reduce the protocol efficiency.

When another peer later receives a particular piece, the piece checksum is compared with a recorded checksum, to check that the piece is error-free. In the case of the BitTorrent protocol, the output information produced by the SHA1 algorithm (info_hash) is 20 bytes long and is listed in the torrent file at the field "Pieces," so that this field is responsible for verification of the data pieces' integrity, and therefore of the integrity of the content itself.

In several contexts that comprise the use of media content (computer vision, speech recognition, and information retrieval) and also in new emerging standards such as MPEG-7, P/META, it may be known how to resort to techniques for semantic feature extraction. This may facilitate the identification of a certain media content, for example, with the aim of its classification and archiving, and with possible advantages on the end-user side.

In the case of multimedia content, the so-called "storyboard" is an example of semantic feature extraction, which may be used to improve video browsing. Semantic content may be presented as text lines or "thumbnails," as it is the case, for example, for YouTube® interface.

In the case of video files (for example, films or videoclips) it may be known how to resort to various techniques of motion estimation, labelling (or tagging), color histogram analysis, edge or shape detection, audio analysis, speech-to-text, speaker recognition, etc. as semantic feature extraction techniques useful for identifying key frames that, shown to the user, may give a sufficiently accurate indication of the content of a particular file. This may happen, for example, by showing a storyboard of a video file as a sequence of frames. An example of an application of these techniques is the VideoBAY® browser.

The display of a storyboard is a presently used technique in P2P networks, which may help the user to retrieve the semantic content before starting the downloading process of a file, particularly if the same is a relatively large file. The storyboard check tends to become a nearly constant habit, also to reduce the pollution by dissemination processes of undesirable content. As a consequence, several .torrent files may be created from compressed archive files that include both the video and "semantic" data, such as a storyboard, the included songs or various other types of semantic information being related to the content. The semantic data may be archived in a compressed package with the original movie as additional and separate files.

This approach forces the user, in order to retrieve the semantic data, to access the P2P network and to download (at least partially) the package and at least a part of its content. The presence of a storyboard also may not necessarily offer a protection against malicious behavior, such as the intervention of somebody who may create a fake archive including a different content/storyboard association and create a new corresponding .torrent file.

In the case of the .torrent file known as Vuze (also as Azureus), the centralized WS provides, beside the .torrent metadata file, information about the content, which may be retrieved through the BitTorrent network. The client application may embed a browser that may access the central server to retrieve a preview of available content. A click on the content preview allows the client to download the associated .torrent file, which is then used to access the P2P network. In this case, the association between the content and the related metadata may be guaranteed by a central database provided by the official Vuze web server.

This approach has two major drawbacks. In the first place, it centralizes the distribution of content and of the associated P2P metadata, forcing the client to connect to a specific web server to retrieve the metadata in object, which reduces the spectrum of the possible metadata distribution channels. Secondly, this approach is not applicable to lightweight devices (for example, mobile terminals), as the browsing capabilities of which may be necessarily limited. It is to be noted that the traditional BitTorrent approach may not prevent the distribution of .torrent files via other means, such as email, USB keys, FTP, chat, Facebook etc., which may be useful with respect to user generated content when the producer of the content wishes to control and limit the distribution of a certain content. As already explained, the metadata distribution may take place outside the P2P network, and may be either public (for example, on a web server without limitations) or restricted to a community of peers. For example, if a user wishes to share the film of his/her wedding through the P2P network, he/she will generally not distribute the metadata (.torrent file) representing this content publicly, but only to relatives, possibly sending them an email with the related .torrent file enclosed.

U.S. Patent Application Publication No. 2007/033170 describes performing a query of content through a query of the associated metadata, also in a P2P environment, without providing any indication related to processes for associating and protecting semantic information linked to the content itself. Similarly, U.S. Patent Application Publication No. 2007/0038612 refers to the use of a multimedia bookmark, including information concerning a segment corresponding to an intermediate point within a method for indexing, query, identification, and processing of portions of a certain content. No reference is made therein to possible applications in a P2P context.

Moreover, U.S. Pat. No. 5,646,997 discloses an approach applicable to digital distribution systems. Information relating to a certain media content is obtained and formatted by using a portion of a data structure, so as to create a media package, with subsequent ciphering and storing of the same for a subsequent transfer onto a record medium. The aim of this is to allow a subsequent interpretation of this information to create information for the use of such a medium. The patent therefore deals with "watermarking" approaches for the protection of multimedia content, without taking into consideration a "Peer-to-Peer" scenario.

SUMMARY OF THE INVENTION

The previously described approaches may not meet the needs of an end user who wishes to choose, with a sufficient level of trust (meaning a reasonable certainty about the content and security about the origin) content to share in a P2P mode. Specifically, it may be desirable for approaches that allow the user not to be forced to download, even partially, the entity (i.e. the media content). Such approaches my also allow the user to be able to have a preview of the content, while keeping in mind, if this is the case, that i) the content may be damaged (corrupted) and/or ii) the very first chunks adapted to obtain a preview may be among the most difficult to obtain from peers in the overlay network, for example, because some peers have just left the network.

In this respect, it may be desirable to consider that the download, even the partial download of the content (even though only performed to obtain a preview) may require time, which may depend on establishing a sufficient number of connections with peers. This is also because, for a node to become an effective uploader, it may be desirable for it to receive a certain amount of data. Moreover, the P2P streaming functions generally require that, for the user to start his/her player and to watch even the first part of the video, to understand if this is what he was looking for, a peer may wait for a certain period of time, to fill a pre-buffer for a pause-free playback.

Moreover, each error in the sequence of operations concerning the content choice may cause a relevant delay for the end user. This is because a peer detaching from the P2P overlay network may create a rather high churn rate, thus reducing the overall performances of the P2P network, particularly, in the group of users that are sharing that very content.

Regarding security and authentication, content pollution may be problematic in the P2P community, because the distributed entities are normally identified by their name and by a short description. Therefore, malicious users may disseminate, in the overlay network files (or parts of them), a misleading description, pretending to share content, but actually distributing fake content which may not correspond to this desired content. As already explained, they may, for example, intentionally change the association between the content to download and the metadata associated with the content, so that the metadata does not correspond to the content.

Although protocols may be available that may perform various forms of verification concerning content integrity and/or to adopt communication strategies to verify the trustworthiness of each peer in the community, verification forms may still be desired. The verification forms may be performed by the end user by examining the metadata, which describe the content, which may avoid the (in the case the file in itself is not corrupted, because all integrity tests have passed the check) download of pieces of the content to verify the entity of the content itself.

In this respect it may be said that, by resorting to the known approaches, the end user may be ignorant of the actual content of the metadata file being downloaded until he starts to watch the preview of the entity itself. In the current approaches, the metadata file of the BitTorrent protocol includes a relatively small amount of data about the size, the number of chunks, and in general information of interest for the network layer. This happens in such a way that the end user may be misled (also because the user may not remember the exact name of the content he wants to download), or he may not realize that he may not be interested in the actual content, with the further possibility that malicious users may further take part in the process. Even after having chosen the metadata file, the user waits, and the delay to get an amount of information sufficient to evaluate the content may be rather long.

Particularly inexperienced users, moreover, may not be able to activate the preview feature, and may be induced to download the file completely before being able to check if they are really interested in the content. Also for experienced users, for whom the problem of wasted time is not in any case negligible, the preview may turn out as unsatisfactory or meaningless (for example, if the user is interested in a scene that takes place only half an hour after the beginning of the movie).

Together, with these uncertainty factors connected to the action of "clicking" the start of content downloading, other drawbacks should not be neglected, because a particular user may recognize, also in a rather short time, an absence of interest in the temporarily chosen content. In this case, network resources (bandwidth and a considerable amount of computational power) may be wasted because they are used only for verifying that a certain content is not interesting.

Moreover one should typically not neglect the psychological aspect of frustration that a user may encounter when he/she realizes that he/she is using a not particularly subtle technological tool. In evaluating these aspects, possible role of pollution of the P2P network, carried out through deliberate interventions by malicious users who wish to disseminate fake content may be considered. This may be done without altering real data, but by changing the associations between the content and their descriptions at the metadata layer. In other words they may be changed in such a way that the metadata file, which shows the preview includes information that may not correspond to the content. This aspect may take on a certain importance with respect to the undesirable diffusion of pornographic content. As a usual example, suffice it to think of the association of hardcore video content with metadata identifying a fairy tale for children.

Such a behavior may jeopardize the reputation of the content provider, be it a professional operator or a private prosumer. There may also be negative consequences on a financial level, in the case of a professional operator, and of a social nature, in the case of a private user.

It may be desirable for such approaches to allow a relatively efficient provision of the semantic information and/or the information concerning the source (i.e. the producer) related to content shared on a P2P network, and preferably, to verify the integrity of such metadata, excluding that the previously described negative events may take place. The object of the present embodiments is therefore to provide such an approach to above-mentioned problems.

According to the present embodiments, such an object may be achieved by a method having the features set forth in the claims that follow. The embodiments may also relate to a corresponding devices, and a computer program product, loadable into the memory of at least one computer and comprising portions of software code for performing the steps of the method when the product is run on at least one computer. As used herein, the reference to such a computer program product is intended to be equivalent to a computer-readable medium including instructions for the control of the computing system, so as to coordinate the execution of the method. The reference to "at least one computer" is meant to highlight the possibility for the present embodiments to be implemented in a modular and/or distributed form. The claims are an integral part of the technical teachings of the invention provided herein.

Various embodiments provide a function of creation and, in a complementary way, of extraction of metadata based upon media content (audio, video, etc.) to be distributed on a P2P network.

In various embodiments, the semantic information may comprise information chosen among video frames, words obtained by conversion of speech into text, comments, and mp3 files. The information may be optionally extracted automatically from the content, or else manually added, preferably in conjunction with an identifier of the producer of the content.

In various embodiments, the downloading of data (such as those currently provided, for example, in a .torrent file to enable access to media content shared on a P2P network) may be enriched with information of a more semantic nature related to the content itself ("semantic" metadata) and/or to the content producer ("source" metadata). The information may improve the rate of satisfaction and reasonable certainty, which may enable the user to have a complete and effective preview of the content before accessing the content through the P2P network.

In various embodiments, the metadata may be validated through a digital signature, to check integrity, for example, through a hash string encrypted through a public key, generated and associated to the content producer.

In various embodiments, the integrity check may ensure that the information inserted by the content producer is not altered throughout the distribution phase. In various embodiments, differently from what happens in known approaches (wherein the user must start downloading the content before having a clear idea about it), various embodiments may provide meaningful and actually usable information, to give the final user an idea about the content of a certain media object before actually accessing it.

Various embodiments may allow effective research and retrieval of a determined media content, which may improve the user satisfaction and increase the overall efficiency of the network system. Various embodiments may provide tools for a security check to protect the information provided by the content producer. This may be in addition to the traditional approaches, wherein only the content integrity is checked. Various embodiments may be used by a community of producers/consumers (prosumer), even within small sized networks.

Various embodiments may provide techniques that allow the creation and/or the extraction a new metadata format, which may be used for the distribution of media contents in a P2P environment, using, for example, a BitTorrent protocol. It will be appreciated, however, that the reference to this particular kind of protocol is for the sake of example only, because various embodiments may also be used in conjunction with P2P protocols of a different kind (for example, the previously mentioned similar protocols).

Various embodiments may allow the integration of any kind of semantic information (audio/video/text) related to the content itself and to the content producer. Various embodiments may allow the use of algorithms of a different kind to retrieve the semantic information from an audio/video content.

In various embodiments, the operation of extracting the semantic information may be associated with an integrity check of the set of metadata. Various embodiments may allow improvement, by enriching the video browsing experience by the P2P users, with a deterring effect on malicious tampering.

Various embodiments may be based on a function of creation and extraction of metadata to modify semantic information. This may improve the traditional metadata formats through the creation, the incorporation, and the elaboration of the semantic information extracted from the content. This approach may be performed via software (both embedded software and third party software).

It will be appreciated that this procedure may be applied both to existing and to future formats, that may be used in a P2P environment or, more generally, in a distributed client-server environment to reduce the waste of resources in case of a wrong decision related to the content to be downloaded. The above has the aim of making the choice of the final user more useful and enjoyable, increasing the trustworthiness in the community of prosumers and in the social network, and in content distribution networks operating on a professional level. The invention will now be described, by way of example and not of limitation, with reference to the enclosed representations.

DETAILED DESCRIPTION OF THE PREFERRED EMBODIMENTS

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the embodiments.

Figure 1:
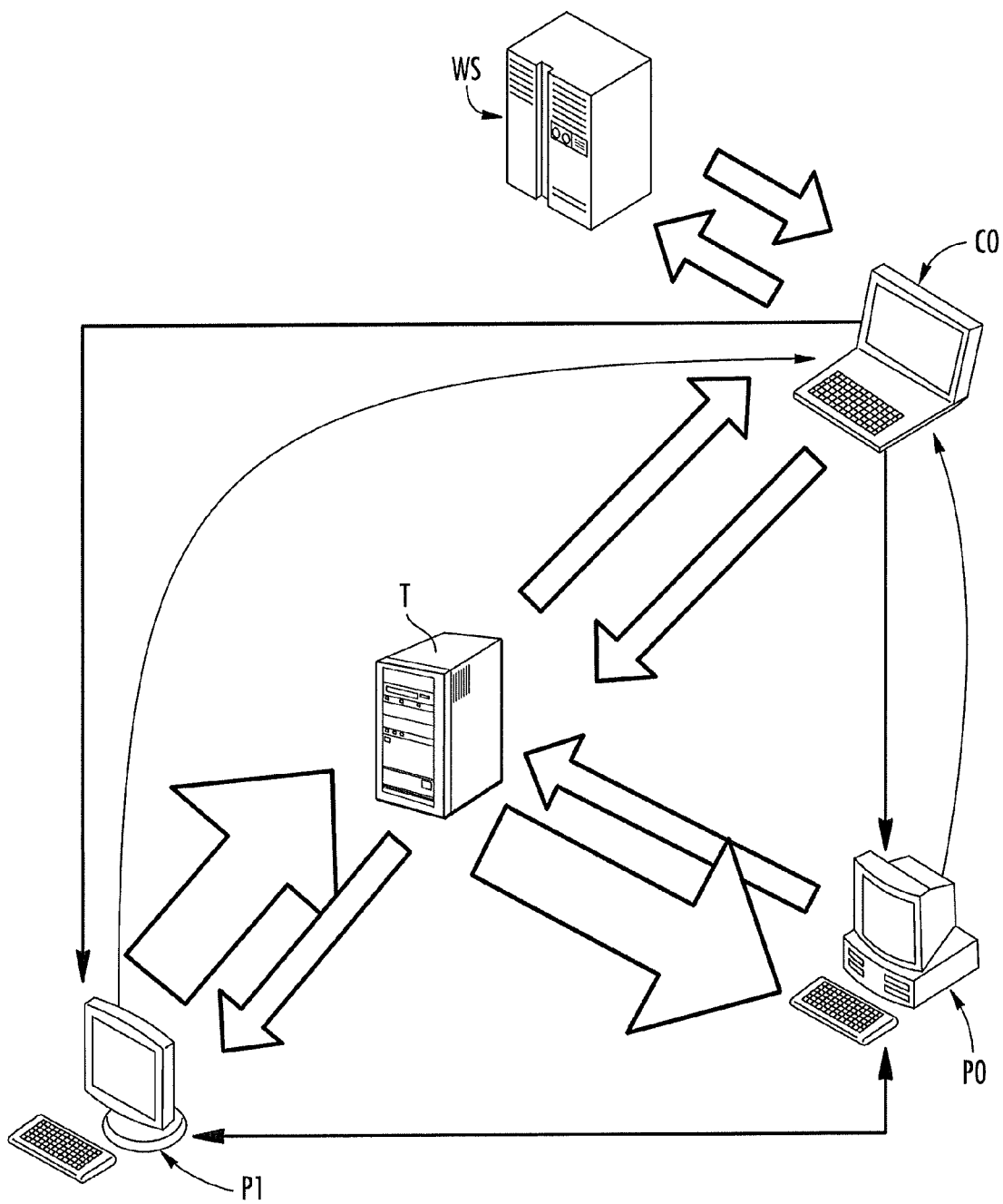
FIG. 1 is a schematic diagram of P2P system in accordance with the prior art.
Figure 2:
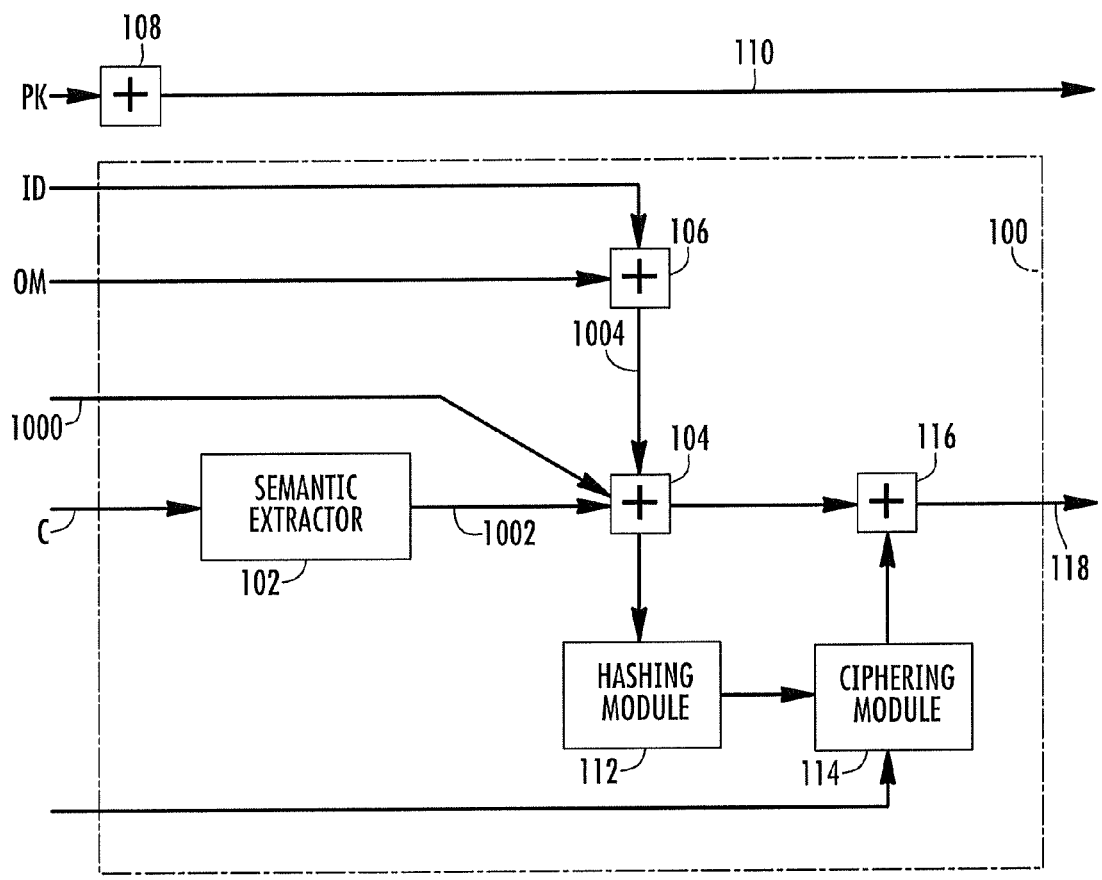
FIG. 2 is a functional block diagram of a file creation module in accordance with an embodiment.

The diagram in FIG. 2 generally summarizes the structure of a module 100 for extracting from content C, via a semantic extractor 102, "semantic" metadata 1002 related to the content that they are to be added. The "semantic" metadata 1002 is added to the content in a node 104. Also added is metadata representative of the "source" identity 1004 relating to the content producer and comprising, e.g. an identifier ID of the producer, in conjunction with optional semantic metadata OM previously added to the identifier ID in a node 106. "Downloading" metadata 1000 relating to the P2P network which hosts the application, and substantially corresponding to the previously described metadata, which allows the user to download the media contents from the network is also added at the node 104.

The semantic metadata concerning the content may correspond, as will be described in more detail in the following, to the audio/video information that may represent/summarize the presently referenced content.

The information indicative of the content producer may be particularly useful for its possible use within a prosumers' community, where the users upload their own content into the network. This mechanism may also be used by professional content providers, both to improve the trustworthiness of the users and to convey general and brand or advertising information.

As will be more clearly understood in the following, the identifier ID may also be sent to a node 108, where this ID is associated with a public key PK, to be distributed through a channel 110. The channel 110 is generally different from the channels normally used for the content distributed on the P2P network. For example, channel 110 may be a central server which verifies the association between the producer ID and the public key, or else a direct distribution channel from the producer to his counterparts (as in the previously mentioned case of relatives).

In node 112, the useful metadata amount generated by the node 104, i.e. the set of semantic metadata coming from the extractor 102 of the metadata indicative of the source or producer and of the downloading data 1000 (for example, a .torrent file or the like), is subjected to a "hashing" operation. Thus, the corresponding hash string is sent to a ciphering (encrypting) module 114, to generate a digital signature. In a node 116, the digital signature is added to the metadata being output from the node 104, and is distributed together with it, while through the P2P network, the content is distributed. The metadata, the signature, and the public key may be distributed through the same channel or through different channels.

The provision of a digital signature may allow a user wishing to "consume" a certain content to be able to verify the validity of such a signature based upon a relatively simple process, which may be particularly useful in social networks, wherein the trustworthiness in a certain prosumer may be of particular importance to ensure friendly relationships, and which may allow the recognition of the single user's contribution to the social network. In various embodiments, the above described aspects are mutually related because, just as in the case of the presently considered example, the digital signature generally depends on the information expressed by the useful amount of metadata as a whole. This dependence may have a beneficial effect on the transparency of the dissemination process within the network by allowing each user to recognize if anyone has polluted the metadata set.

Various embodiments may protect the information in the metadata file against those who want to maliciously perform a generation of fakes or of pollution. This approach may be applicable in social networks, where the single user may choose and identify friendly users through semantic identifiers, labels, and avatars, which are trusted and which, in various embodiments, may be simply integrated in the metadata file.

Various embodiments considered herein may create and decrypt a trusted semantic metadata format. The ensuing metadata file may be extended to include a certain amount of semantic metadata representative of the content and of the producer. In particular, it may be possible to insert information concerning the content authenticity, the producer's authenticity, and a synthesis of the multimedia information, into the file or any other information format for storing (for example, file formats), or distributed on client/server networks (for example, SDP protocols) or P22 networks (for example, .torrent files).

Referring to the diagram of FIG. 2, the content C is supplied as input into the semantic extractor 102, and the semantic engine embedded in the extractor is configured to generate semantic metadata, as better detailed in the following examples.

Also the information concerning the producer (basically his ID) comprises system access data. The system may expect to receive some information, represented by the metadata 1000, which substantially corresponds to the traditional .torrent file, denoted by the reference 1000.

The private key KP is usually derived from a protected source (for example, an encrypted code on the hard disk of the user's terminal, e.g. protected by a password). As for the identifier ID, it may include of include any information/format which may identify one user uniquely.

In various embodiments, the identifier ID may be metadata that allows association and retrieval of the correct public key in the extraction step. It will, however, be appreciated that the association between the identifier ID and the public key PK may not belong to the creation process, and that the public key PK may not be included in the metadata format. In this way it may be possible to perform a trusted distribution of the public key by attributing to the latter, a unique association with the content producer. For professional content, this connection may be verified by a trusted third party, such as a certification authority entitled to certify that a certain public key is uniquely associated to a certain content producer.

In the case of user-generated content, wherein it may be important to recognize the (possibly virtual) identity of the producer (prosumer), the association between the public key PK and the identifier ID may be verified, for example, by the service provider, in the case of a social network (for example, in the form of a public key that is part of account information for Facebook™, MSN™ etc.). Another possibility may allow the direct provision of the key by the producer to the related users through various known delivery systems (e.g. email, USB key, chat).

In the following, examples will be given of possible criteria to be used for the addition of semantic metadata, both representative of the content and identificative of the producer of such a content. This description has a purely exemplary function. Those skilled in the art will appreciate that the present description may not be concerned with the kind of semantic metadata used, nor the criteria according to which semantic metadata may be generated (to this purpose any known technique may be resorted to), but rather, the criteria by which such metadata, whatever it may be and however it may be generated is made available, for example, by associating a digital signature to it.

Regarding the content, the extracted information at the semantic metadata level may comprise for example, one or several images, one or several video sequences (for example, a so-called trailer), and one or several audio information elements, such as, music, song titles, texts etc., related to the soundtrack of a video file. The extracted information may also include one or several text elements, such as, for example, a description of multimedia content, its author, the actors, the plot, reviews, etc. These images, videos, audio, and/or text content may be extracted from the content, which is uploaded into the network and later downloaded through an analysis performed according to known criteria, and in general adapted to originate a semantic data file of variable size.

In the case of still images, it may be possible to provide the insertion of a so-called storyboard (a sequence of frames which represent the development of the whole video sequence) into the metadata file created according to any algorithm adapted to operate on single frames. In the case of audio/video content, it may be possible to provide the incorporation of text, audio storyboards (for example, fragments of songs or possibly whole songs from the soundtrack), fragments of dialogues or possibly whole dialogues, or tags of semantic text, also acquired through analysis and, if needed, processing of subtitles, resorting to known techniques, possibly in conjunction with speech recognition algorithms.

In the particular case of video content, it may be possible to make use of short video sequences, for example, trailers, obtained by known techniques of video content analysis. Still referring to video content, it may be possible to provide the incorporation of chunk references, to retrieve, in advance, those specific chunks that include the most significant part of the sequence, so as to be able to build the storyboard in the user application. This may involve access to the P2P network to retrieve the storyboard, but in conjunction with the possibility for the storyboard to be already wholly included in the metadata file (and therefore the possibility for the user application to show it without accessing to the P2P network).

In the case of text, the incorporated text may describe a film, its content, the actors, the plot, etc. The corresponding extended metadata format may include a block for extracting the semantic metadata from the content.

As for the metadata identifying the producer, by the identifier ID, the information added at the metadata level may comprise, for example, a welcome message, or else a multimedia representation of the producer himself, either a professional provider or a prosumer. This may comprise, for example, images, such as, the company brand or an avatar (a small portrait, an icon, a generic symbol representing the user), or one or several videos (for example, a representative trailer of the content producer, e.g. taken from his previous works or simply the introduction to the public of the author of the content being disseminated). In this case, it may also be possible to resort to audio content (music, songs titles, and lyrics from a soundtrack related to the content file).

In various embodiments, the metadata may be generated in a different way, for example, through configuration files, interactive questions to the user, retrieval of the profile from a social network, etc.

Once again, it is noted that this disclosure has a purely exemplary function. In this respect, those skilled in the art will appreciate that the present description may not specifically concern what metadata indicative of the producer is to be used, and what criteria may be applied to generate such metadata (for this purpose, it is possible to use any known technique), but rather it concerns the criteria by which such producer-related metadata, however they may be generated, may be made available, for example, by associating a digital signature to them.

Also referring to the verification function of the digital signature, with the aim of verifying the metadata integrity, it may be possible to use any known approach. The examples considered herein refer to a hash function, which may be subject to ciphering through the public key PK owned by the content producer (according to methods already discussed with reference to the diagram in FIG. 2).

Figures 3A, 3B:
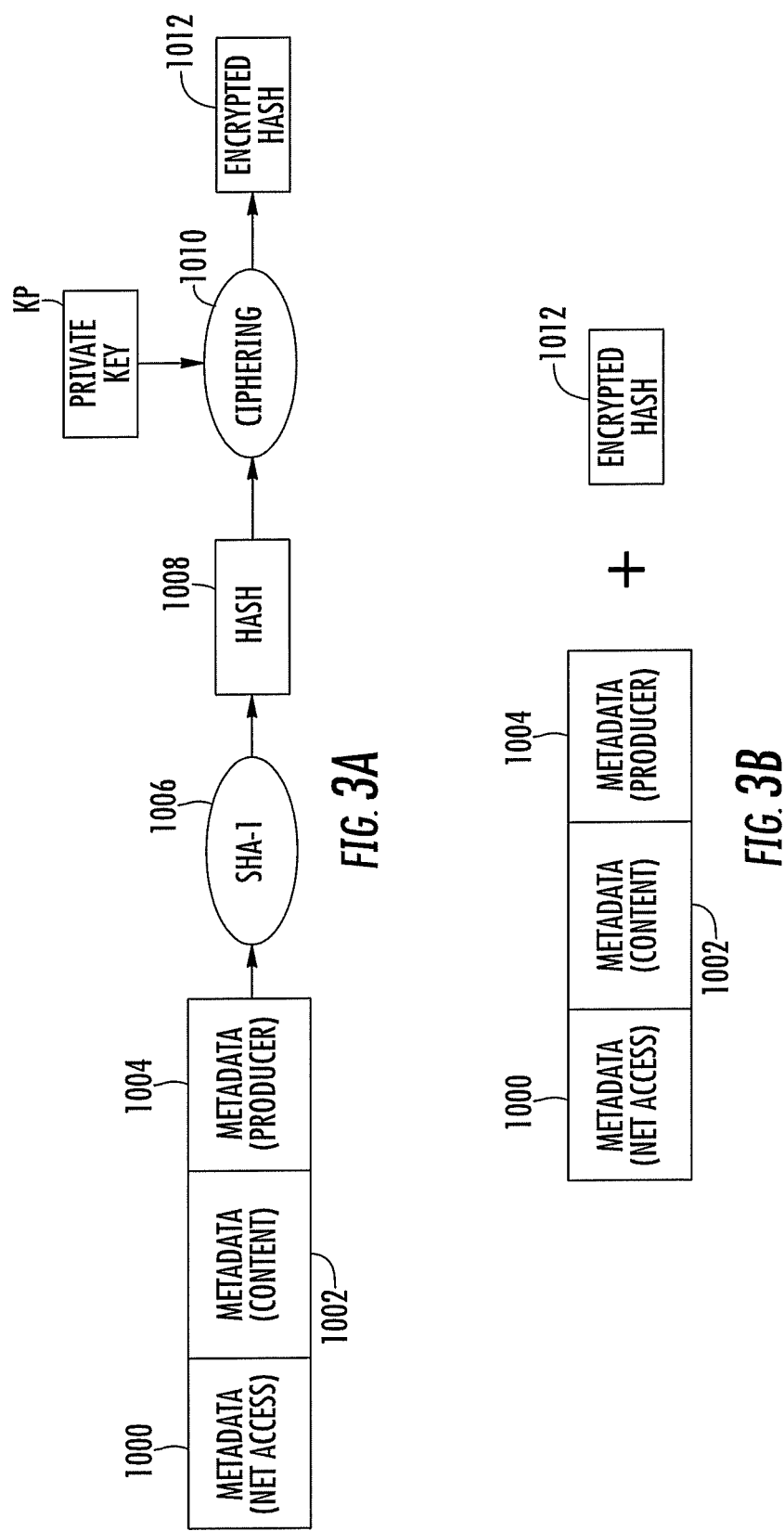
FIG. 3a is a functional block diagram of a sequence of operations performed on metadata in accordance with an embodiment.
FIG. 3b is a block diagram of a set of metadata and a digital signature according to an embodiment.

FIG. 3a, shows how a "downloading" metadata file 1000 corresponding to the traditional format (for example, to a .torrent file of a currently used kind, which already includes the metadata 1000 of FIG. 2 concerning the network access criteria) may be integrated, according to various embodiments, with the content metadata 1002 and with the producer-related metadata 1004. At 1006, an algorithm, such as SHA1, is applied to the set of metadata 1000, 1002, 1004, with subsequent hash generation, represented by block 1008, which is subject to the ciphering function, represented by block 1010, performed according to the private key KP. The resulting product of the whole procedure is an encrypted hash, represented by block 1012. FIG. 3b, exemplifies the fact that the set of metadata 1000, 1002, 1004 and the same digital signature represented by block 1012 are practically substitutes, in the presently considered examples, for the file 1000 (for example the traditional .torrent file).

It will be appreciated that in the example considered in FIG. 3, the set of downloading metadata 1000 and set of semantic metadata 1002 (which includes the content-related information) may be enriched by adding the producer-related metadata 1004. The new set of metadata may be subjected to the SHA-1 function, i.e. the engine that generates a hash string. This string subsequently undergoes ciphering with the private key KP, which may only be available to the content producer so as to form a digital signature, which is an encrypted hash string.

Figure 4A:
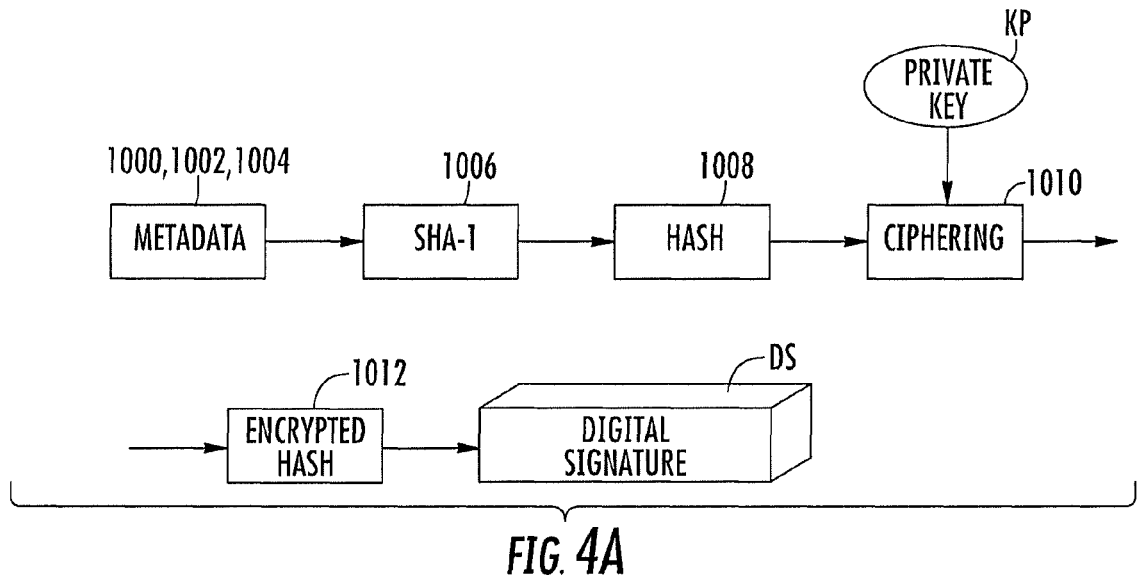
FIG. 4a is a functional block diagram of a sequence of operations performed on metadata in accordance with another embodiment.
Figure 4B:
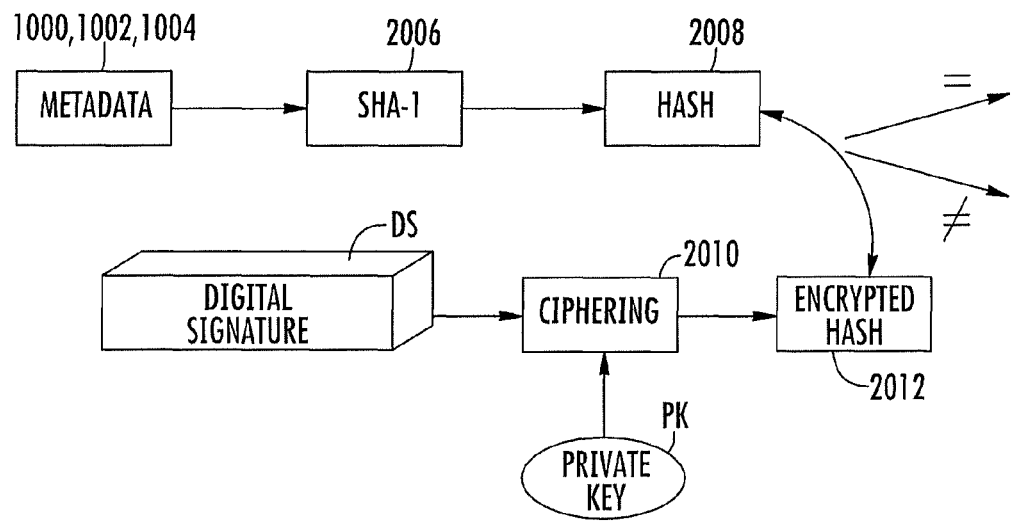
FIG. 4b is a functional block diagram of a set of metadata and a digital signature in accordance with another embodiment.

FIG. 4a, shows again the previously described sequence of operations, referring to the operations performed on the metadata 1000, 1002, 1004 with the aim of obtaining a digital signature DS. FIG. 4b, shows the operations performed in a complementary way at the level of a user who receives the above mentioned metadata 1000, 1002, 1004 and the digital signature DS.

On the content consumer side, the metadata 1000, 1002, 1004 may be subjected to the same SHA-1 function (block 2006 in FIG. 4b), as the block 1006 used by the source. The obtained outcome, shown by block 2008, identifies a potential hash which may be allocated in a buffer waiting for validation. On the other hand, the digital signature DS is decrypted in 2010 with the public key PK. If the digital signature has not been counterfeited, the block 2012 obtained by decryption of the digital signature DS would be the same as the block 2008 obtained through application of the SHA-1 algorithm on the metadata. If the two blocks 2008 and 2012 match, the digital signature is validated.

In the presently considered example, the consumer terminal may perform three functions. It calculates a hash (block 2008) of the metadata information (block 1000, 1002, 1004) which may be transparent information in itself (exactly as the content producer has done) through the function 1006. It may also decrypt the digital signature DS through the public key PK received from the network (through chat, forum, or face to face), to obtain the hash data 2012. It may also check (through comparison of the hashes, as illustrated in FIG. 4) that the metadata have not been altered in any way.

It will be appreciated that the check may not have the primary function of verifying if the producer is trusted or not. The alteration, if it takes place, has been performed by other subjects. The same ID of the producer, as a part of the metadata, may have been modified (and in this case the retrieved public key is presumably wrong and the verification fails in any case). If the conclusion points to the fact that the metadata has been altered somehow, the application may refuse to download/retrieve the content.

In the presently considered example, the receiving user performs a deciphering operation (decrypting 2010) of the digital signature, to verify the metadata integrity by making use of the digital signature DS and operating with the public key PK (broadcast over the network according to the procedure previously described in conjunction with FIG. 2, and retrieved from the producer ID). The semantic information representative of the content (metadata 1002 and 1004) may not in itself require an encrypting procedure. The presently described approach may therefore be flexible, as it allows a backward compatibility with traditional formats (visible and not encrypted) that do not embed semantic information indicative of the content and the producer, but which, nevertheless, include other metadata, such as, for example, the file name and size.

Such a mechanism of metadata integrity verification may increase the trustworthiness of the user in the social network, thus enriching his/her experience and keeping the semantic information transparent to the final user. Moreover, it may increase the trustworthiness of the producer, who on one hand may be assured that his name (or better his ID) is not going to be arbitrarily associated with content different from what he/she has actually generated, and on the other hand may be certain that he is going to be recognized as the producer of his/her contents.

Figures 5A, 5B:
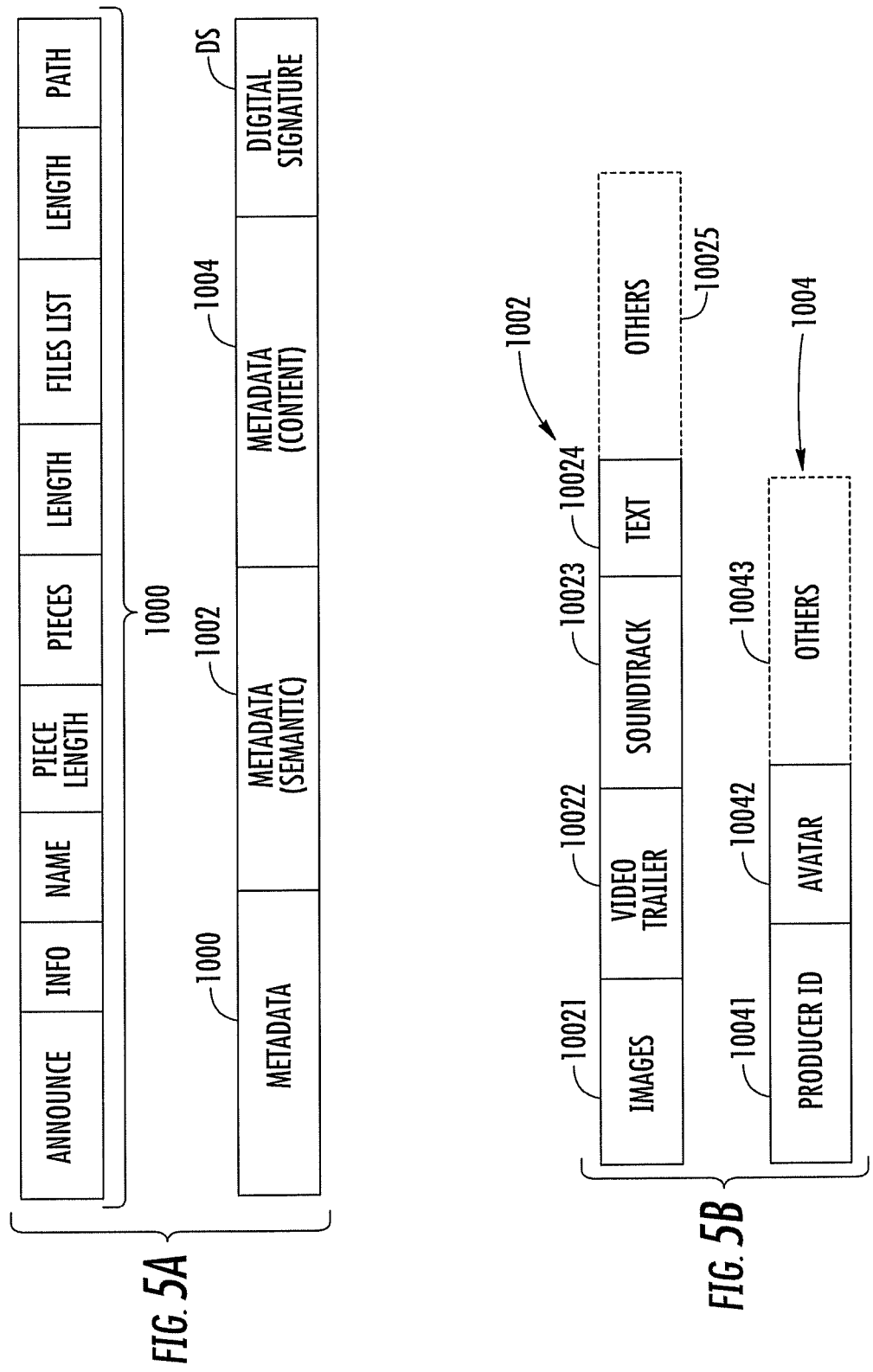
FIGS. 5a and 5b are diagrams of different protocol formats.

FIGS. 5a and 5b, compare the structure of a .torrent file according to the traditional and previously described setting (with the following fields: announce, info, name, piece length, pieces, length, files list, length path) with the presently considered format, where the file is "enriched" with the semantic metadata 1002 and with the metadata indicative of the producer 1004 and the digital signature DS.

Specifically, FIG. 5b, shows a possible organization of both fields 1002 and 1004, comprising, for example, in the case of semantic metadata 1002, the presence of images 10021, of a video trailer 10022, of a soundtrack 10023, and of text 10024, optionally in conjunction with further semantic metadata 10025. The fields 1002 and 1004 also include, in the case of the metadata 10024 indicative of the producer, the possible presence of an identifier ID 10041, of an avatar or similar information 10042, and of further information on the metadata layer, as indicated by 10043.

Once again it is noted that what is presently disclosed has a merely exemplary purpose. In this respect, those skilled in the art will appreciate that the present disclosure does not concern specifically what metadata 1002, 1004 is used and the criteria according to which such metadata is generated (to this end one can resort to any known technique), but rather it concerns the criteria according to which such metadata 1002, 1004, whatever it is and however it has been generated, is made available, for example, by associating it with a digital signature.

Figure 6A:
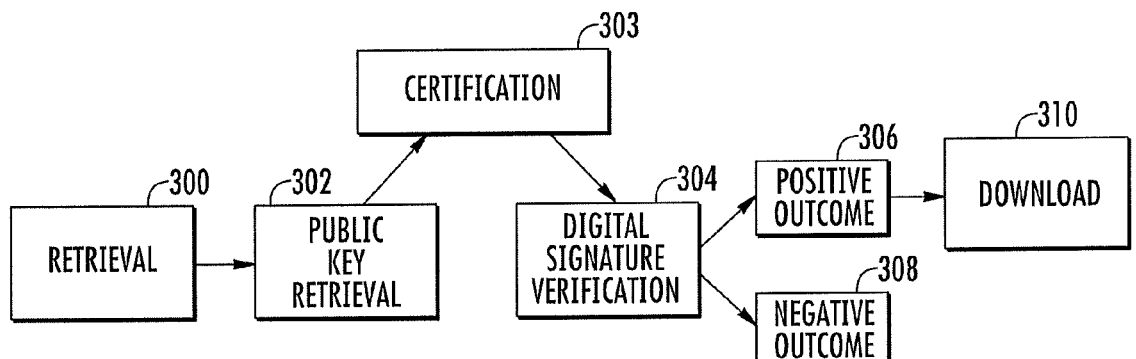
FIGS. 6a and 6b are schematic diagrams of content authentication protocols.
Figure 6B:
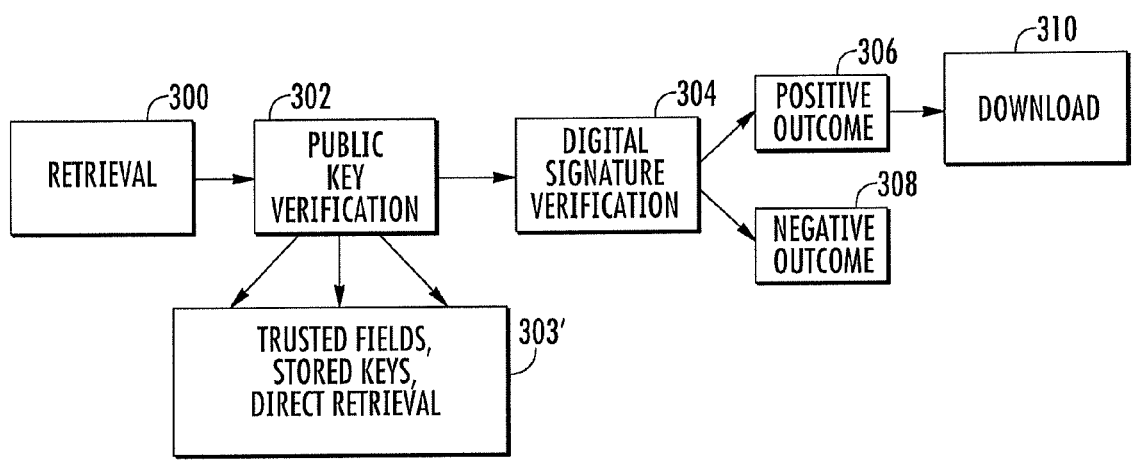

FIGS. 6a and 6b, shows an example of a content downloading operation from a P2P network, in the case of a "professional" content (FIG. 6a) and in the case of a content generated in a non professional context (for example, by a prosumer) (FIG. 6b). In both cases, block 300 indicates the retrieval operation of the file having metadata (for example, a .torrent file) by the user, from the producer ID included in the metadata, while step 302 represents the public key retrieval operation.

In the case of professionally delivered content, the key may be obtained from a certification organization, indicated by the block 303. In the case of a prosumer generated content, block 303' indicates various retrieval possibilities for the public key, i.e. through keys stored on a local layer in a trusted mode (for example, at the personal computer layer), or else the retrieval through trusted friends within an online social network (for example, resorting to Facebook™ or MySpace™), or otherwise through a direct retrieval.

It will be appreciated that the social network itself may be adapted to verify the association. For example, at the moment of the user's registration, the user may be asked his/her public key. The association nickname—public key would be stored from then on in the social network servers, which a second user would have to address to retrieve the first user's key (to subsequently verify the authenticity of a content produced by the latter). However obtained, the public key may be used at a step 304 for the digital signature verification.

Block 306 indicates the positive outcome of the check, while block 308 indicates the negative outcome of the check. The positive outcome leads, in a step 310, to the start of the downloading process, while the negative outcome 308 interrupts the process, without further allocation/use of resources.

Figure 7:
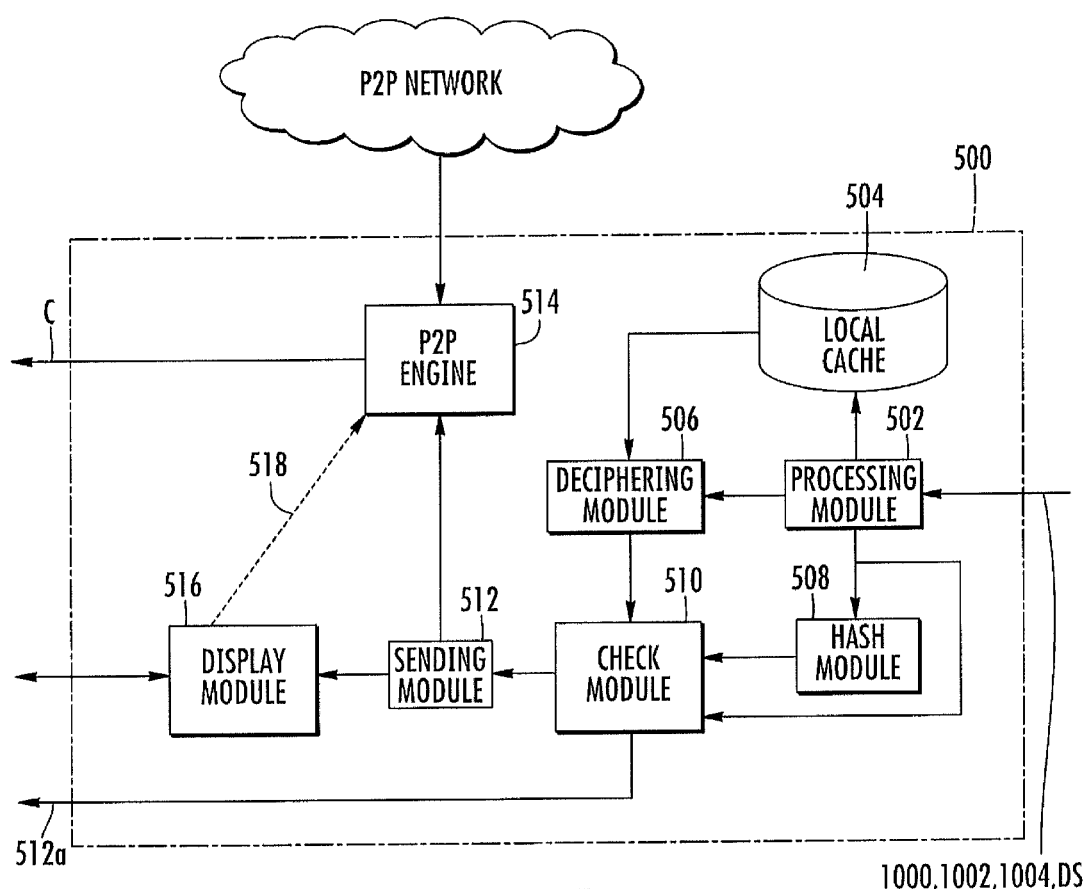
FIG. 7 is a functional block diagram of a metadata extractor according to an embodiment.

The diagram in FIG. 7 shows a possible structure of a module 500 configured to extract the metadata 1002 and 1004 according to the previously described procedure. In FIG. 7, reference 502 indicates a block configured to process the set of metadata 1000, 1002, the metadata being indicative of the producer, denoted by 1004, and the digital signature which is sent to module 506.

The latter data is sent to a local cache 504 for the retrieval of the public key, which is configured to be used in a block 506 for the deciphering function of the previously described digital signature DS. The use of a cache is not essential, but it may reduce the number of times the key is retrieved, in case the contents are from the same producer.

According to the procedure previously described with reference to FIG. 4b, the set of metadata (payload) 1000, 1002, 1004 output from the block 502 is split over two paths. The first is sent to a hash computing module 508, the output of which is sent to a check module 510. The second path is sent directly to the block 510 (in various embodiments the value is copied in a buffer in the block 510). The check module 510 compares the hash value generated by module 508 and the hash value obtained from the digital signature decryption in step 506. The block 510 thus checks the two hash values (i.e. Hash and Hash) from the blocks 508 and 506, to verify if the metadata payload extracted at the receiver is "authentic" or not.

It will be appreciated that in the hash checker block 510 two hash values may be compared without passing from the hash values to the original strings. Module 510 performs the integrity check on metadata 1000, 1002, 1004, wherefrom the flow proceeds to line 512a in case of a negative outcome, with the interruption of the file downloading process, or otherwise to the start of downloading in case of a positive outcome.

The positive outcome of the check performed in the module 510 is communicated to a module 512, which sends the metadata denoted by 1000 in FIG. 2 (which, as for our present interest, may in practice be considered as coincident with metadata 1000) to a P2P engine 514, configured to connect to the P2P network to perform the downloading of content C.

Once again, it will be appreciated that such a downloading operation may start only after the previously described operations have been performed, and specifically it may be performed if the check function performed in module 510 has had a negative outcome. This may reduce the negative effects described in the introductory part of the present disclosure.

Moreover, the semantic data 1002 may be sent (preferably together with the data 1004 indicative of the producer) toward a display module 516, which may display the data to the user U, achieving the interaction between the user and the system. Specifically, as schematically indicated by the broken line denoted by 518, such an interaction may have the form of an acknowledgment from the user to the P2P engine 514, according to a process whereby the downloading may not be started automatically (as it was previously implicitly assumed for exemplary purposes), but after having obtained the acknowledgment from the user U, after the latter has examined the semantic and/or information data concerning the producer.

It will be appreciated that the function of the local cache 504 may be substituted with a connection that is configured to interface the extractor module 500 with an external system, which can provide a trusted association between the identifier ID and the public key. The presently considered exemplary embodiments provide an association of the downloading metadata 1000 both with the semantic metadata 1002 and with the metadata 1004 identifying the producer/source. Various embodiments may provide a coupling of the downloading metadata 100 either with the semantic metadata 1002 only or with the metadata 1004 identifying the producer/source, while keeping the described advantages with respect to the coupled metadata. Similarly, the use of the digital signature is not mandatory.

Of course, without prejudice to the underlying principles of the invention, the details and the embodiments may vary, even appreciably, with respect to what has been described by way of example only, without departing from the scope of the invention as defined by the annexed claims.

That which is claimed:

1. A method of distributing media content over a peer-to-peer (P2P) network, the media content having downloading metadata associated therewith to be accessed to start downloading of the media content from the P2P network, the method comprising:
    extracting semantic metadata from the media content, the semantic metadata describing contents of the media content;
    coupling the semantic metadata and source metadata indicative of a source of the media content to the downloading metadata;
    permitting access to the downloading metadata and to the semantic metadata and the source metadata coupled to the downloading metadata, the semantic metadata and the source metadata being accessible without downloading the media content;
    computing a hash of the downloading metadata and the semantic metadata and the source metadata coupled to the downloading metadata;
    ciphering a result of the hash to generate a digital signature based upon a private key of a user; and
    checking integrity of the coupled metadata based upon the generated digital signature.

2. The method of, claim 1 further comprising generating the digital signature as a function applied to the hash.

3. A method of distributing media content over a peer-to-peer (P2P) network, the media content having downloading metadata associated therewith to be accessed to start downloading of the media content from the P2P network, the method comprising:
    extracting semantic metadata from the media content, the semantic metadata describing contents of the media content;
    coupling the semantic metadata and source metadata indicative of a source of the media content to the downloading metadata;
    computing a hash of the downloading metadata and the semantic metadata and the source metadata coupled to the downloading metadata;
    ciphering a result of the hash to generate a digital signature based upon a private key of a user; and
    checking integrity of the coupled metadata based upon the generated digital signature.

4. The method of claim 3, further comprising generating the digital signature as a function applied to the hash.

5. A device for distributing media content over a peer-to-peer (P2P) network, the media content having downloading metadata associated therewith to be accessed to start downloading of the media content from the P2P network, the device comprising:
    a microprocessor executing
        a semantic extractor configured to extract semantic metadata from the media content, the semantic metadata describing contents of the media content, and
        at least one coupling module configured to couple the downloading metadata to the semantic metadata and source metadata indicative of a source of the media content;
        at least one digital signature module configured to
            apply a hash function to the downloading metadata and the semantic metadata and the source metadata coupled to the downloading metadata, and
            cipher a result of the applied hash function to generate a digital signature based upon a private key of a user; and
        a check module configured to check integrity of the coupled metadata based upon the generated digital signature.

6. The device of claim 5, further comprising
    a downloading engine executed by said microprocessor, coupled to said check module, and configured to download the media content based upon the integrity check.

7. The device of claim 6, further comprising a deciphering module executed by said microprocessor, coupled to said check module, and configured to decipher the digital signature.

8. The device of claim 7 wherein said check module is configured to check the integrity by comparing the deciphered digital signature with a result of the applied hash function.

9. A device for distributing media content over a peer-to-peer (P2P) network, the media content having downloading metadata associated therewith to be accessed to start downloading of the media content from the P2P network, and also having semantic metadata associated therewith, the semantic metadata describing the contents of the media content, the device comprising:
    a microprocessor executing
        at least one coupling module configured to couple the downloading metadata to the semantic metadata and source metadata indicative of a source of the media content,
        at least one digital signature module configured to apply a hash function to the downloading metadata and the semantic metadata and the source metadata coupled to the downloading metadata and cipher a result of the hash to generate a digital signature based upon a private key of a user, and
        a check module configured to check integrity of the coupled metadata based upon the generated digital signature.

10. The device of claim 9, further comprising
    a downloading engine executed by said microprocessor, coupled to said check module, and configured to download the media content based upon the integrity check.

11. The device of claim 10, further comprising a deciphering module executed by said microprocessor, coupled to said check module, and configured to decipher the digital signature.

12. The device of claim 11 wherein said check module is configured to check the integrity by comparing the deciphered digital signature with a result of the applied hash function.

13. A non-transitory computer-readable medium comprising computer executable instructions for distributing media content over a peer-to-peer (P2P) network, the media content having downloading metadata associated therewith to be accessed to start downloading of the media content from the P2P network, the computer executable instructions being configured to:

extract semantic metadata from the media content, the semantic metadata describing contents of the media content;

couple the semantic metadata and source metadata indicative of a source of the media content to the downloading metadata;

permit access to the downloading metadata and to the semantic metadata and the source metadata coupled to the downloading metadata, the semantic metadata and the source metadata being accessible without downloading the media content;

compute a hash of the downloading metadata and the semantic metadata and the source metadata coupled to the downloading metadata;

cipher a result of the hash to generate a digital signature based upon a private key of a user; and check integrity of the coupled metadata based upon the generated digital signature.

14. The non-transitory computer-readable medium of claim 13, wherein the computer executable instructions are further configured to generate the digital signature as a function applied to the hash.

15. A method of distributing media content over a peer-to-peer (P2P) network, the media content having downloading metadata associated therewith to be accessed to start downloading of the media content from the P2P network, the method comprising:

extracting semantic metadata from the media content, the semantic metadata describing contents of the media content;

coupling the semantic metadata to the downloading metadata;

computing a hash of the downloading metadata and the semantic metadata coupled to the downloading metadata;

ciphering a result of the hash to generate a digital signature based upon a private key of a user; and checking integrity of the coupled metadata based upon the generated digital signature.

16. A method of distributing media content over a peer-to-peer (P2P) network, the media content having downloading metadata associated therewith to be accessed to start downloading of the media content from the P2P network, the method comprising:

coupling source metadata indicative of a source of the media content to the downloading metadata;

computing a hash of the downloading metadata and the source metadata coupled to the downloading metadata;

ciphering a result of the hash to generate a digital signature based upon a private key of a user; and checking integrity of the coupled metadata based upon the generated digital signature.

* * * * *